No. 693,696. Patented Feb. 18, 1902.
F. T. FERNANDEZ.
FASTENING DEVICE FOR ENVELOPS.
(Application filed May 14, 1901.)
(No Model.) 2 Sheets—Sheet 1.
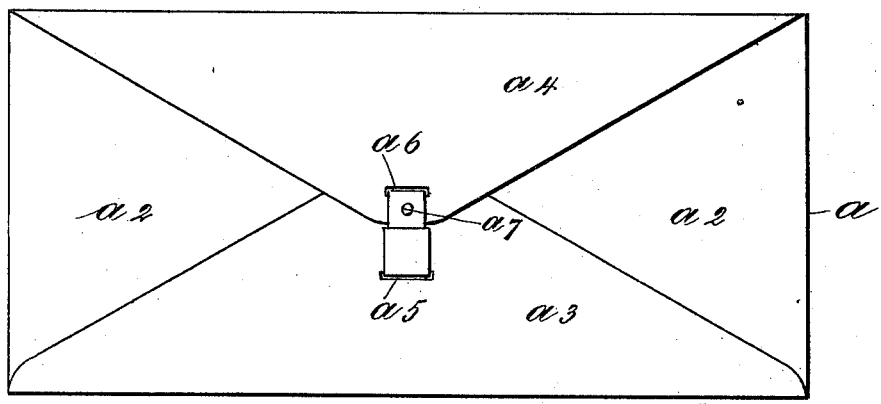
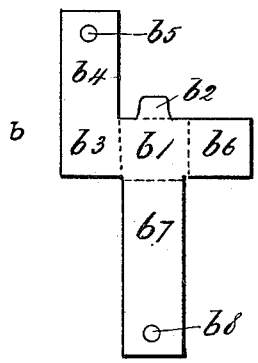 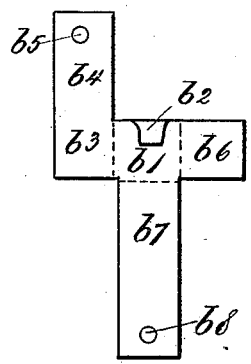 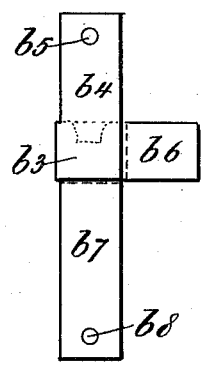 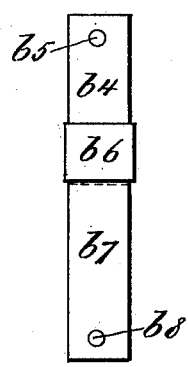
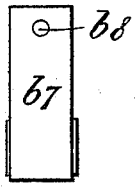 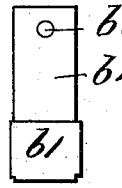 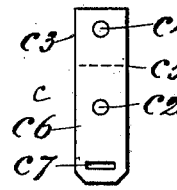 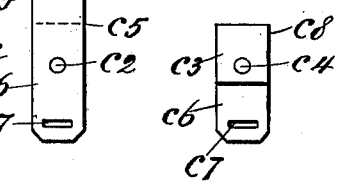
WITNESSES: INVENTOR
Felix T. Fernandez
BY
ATTORNEYS No. 693,696. Patented Feb. 18, 1902.
F. T. FERNANDEZ.
FASTENING DEVICE FOR ENVELOPS.
(Application filed May 14, 1901.)
(No Model.) 2 Sheets—Sheet 2.
Fig. 10
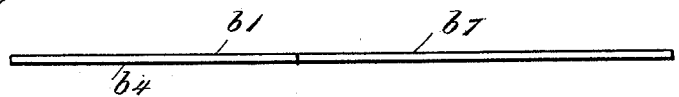
Fig. 11
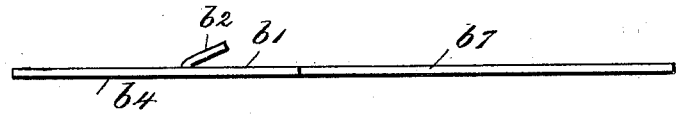
Fig. 12
Fig. 13
Fig. 14
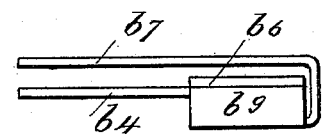
Fig. 15
Fig. 16
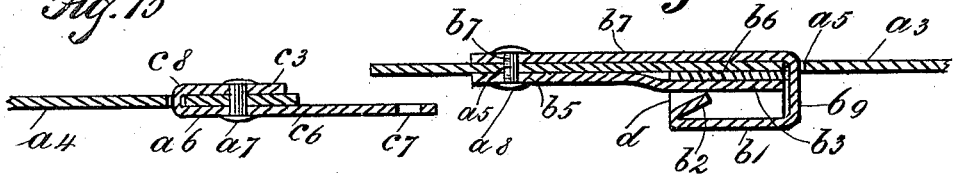
WITNESSES:
INVENTOR
Felix T. Fernandez
BY
ATTORNEYS
THE NORRIS PETERS CO., PHOTO-LITHO., WASHINGTON, D. C.

UNITED STATES PATENT OFFICE.

FELIX THOMAS FERNANDEZ, OF NEW ORLEANS, LOUISIANA, ASSIGNOR OF ONE-HALF TO EDWARD OCTAVE DUCROS, OF NEW ORLEANS, LOUISIANA.

FASTENING DEVICE FOR ENVELOPS.

SPECIFICATION forming part of Letters Patent No. 693,696, dated February 18, 1902.

Application filed May 14, 1901. Serial No. 60,156. (No model.)

*To all whom it may concern:*

Be it known that I, FELIX THOMAS FERNANDEZ, a citizen of the United States, residing at New Orleans, in the parish of Orleans and State of Louisiana, have invented certain new and useful Improvements in Fastening Devices for Envelops, of which the following is a full and complete specification, such as will enable those skilled in the art to which it appertains to make and use the same.

This invention relates to fastening devices for envelops; and the object thereof is to provide an improved device of this class by means of which an envelop may be sealed in such manner that it cannot be opened without destroying or defacing the envelop, so as to leave evidence of the fact that said envelop has been opened.

The invention is fully disclosed in the following specification, of which the accompanying drawings form a part, in which the separate parts of my improvement are designated by the same reference characters in each of the views, and in which—

Figure 1 is a back view of an envelop with my improved fastening device; Fig. 2, a plan view of a blank from which one part of the fastening device is formed; Figs. 3, 4, 5, and 6 similar views showing the successive steps of folding the blank shown in Fig. 2; Fig. 7, an opposite side view of the folded blank as shown in Fig. 6; Fig. 8, a plan view of another blank from which the other part of the fastening device is formed; Fig. 9, a similar view showing said blank folded; Fig. 10, an edge view of the blank shown in Fig. 2, on an enlarged scale; Fig. 11, a similar view showing the blank partially folded, as in Fig. 3; Fig. 12, a similar view showing the blank still further folded, as in Fig. 4; Fig. 13, a similar view showing the blank folded as in Fig. 5; Fig. 14, a similar view showing the blank folded as in Fig. 6; Fig. 15, a section of the folding flap of the envelop through that part of the device which is connected therewith; and Fig. 16, a similar section of a portion of the back of the envelop, showing that part of the device connected therewith.

In the drawings forming part of this specification I have shown at $a$ an ordinary envelop having end portions $a^2$, a side flap $a^3$, and a folding flap $a^4$, and in forming the envelop the end portions $a^2$ are folded in the usual manner and the side flap $a^3$ is folded thereover and secured thereto.

In the practice of my invention I provide a sealing device composed of two separate parts or blanks $b$ and $c$. (Shown in Figs. 2 and 8, respectively.) The blank $b$ is composed of a central portion $b'$, provided at the top with a tongue $b^2$ and at one side with a lateral extension $b^3$, having an arm $b^4$, provided with a hole $b^5$, and opposite the extension $b^3$ the body portion $b'$ is provided with an extension $b^6$, while the bottom of said body portion $b'$ is provided with an arm or extension $b^7$, having a hole $b^8$.

The blank $c$ consists of an oblong strip of sheet metal, provided adjacent to the center with a hole $c^2$, and one end portion $c^3$ of which is provided with a hole $c^4$ and adapted to be folded at $c^5$, while the other end $c^6$ of said blank is provided with a transverse slot or opening $c^7$. In forming the fastening device from these blanks the tongue $b^2$ is folded over the body portion $b'$ to form a spring-hook, as shown in Figs. 3 and 11. The side extension $b^3$ is then folded over the parts $b'$ and $b^2$, as shown in Figs. 4 and 12, and the side extension $b^6$ is then folded over the part $b^3$, as shown in Figs. 5 and 13, and the part or member $b^7$ is then folded over the part $b^6$, as shown in Figs 6 and 14, and this folding of the parts of the blank $b$ forms a box or casing $b^9$, as shown in Figs. 12, 13, 14, and 16, which is adapted to be connected with the side flap $a^3$ of the back of the envelop by passing the part or member $b^7$ thereof through a slot or opening $a^5$, formed in said side flap or the back of the envelop, as shown in Figs. 1 and 16, and the end of the box or casing $b^9$, which is directed toward the folding flap $a^4$ of the envelop, is open, as shown at $d$ in Fig. 16, and the spring-tongue $b^2$ projects backwardly therein.

The blank $c$ is folded at the dotted line $c^5$, so as to form the yoke-shaped device shown at $c^8$, of which the parts $c^3$ and $c^6$ form the sides, and the side $c^6$ is much longer than the side $c^3$, and in practice the longer side of this device is passed through a slot or opening $a^6$ in the flap $a^4$ of the envelop, and a rivet or eyelet $a^7$ is passed through the said sides $c^3$ and $c^6$ of the yoke-shaped device $c^8$ and through the folding flap $a^4$ of the envelop, said rivet or eyelet being passed through the holes $c^2$ and $c^4$ in said blank, which register when said blank is folded, as shown in Figs. 9 and 15, to form the yoke-shaped device $c^8$. A rivet or eyelet $a^8$ is passed through the holes $b^5$ and $b^8$ of the side members of the device, which is connected with the back flap $a^3$ of the envelop, as shown in Fig. 16.

When the separate parts of the fastening device have been connected with the separate parts of the envelop, as shown and described, all that is necessary to seal the envelop is to fold the flap $a^4$ in the usual manner and pass the projecting side member $c^6$ of that part of the device connected with said flap into the box or casing $b^9$, in which operation the spring-tongue $b^2$ enters the slot or opening $c^7$ and the envelop is securely sealed and cannot be opened without destroying the envelop.

This device is simple in construction and operation and preferably adapted to accomplish the result for which it is intended, and said device is particularly adapted for use in the mailing of valuable packages or express-packages, but may be used on envelops or similar packages of any desired kind or class.

Having fully described my invention, what I claim as new, and desire to secure by Letters Patent, is—

1. A fastening device for envelops comprising two parts, one of which is adapted to be secured to the back of the envelop and the other to the folding flap, one of said parts comprising a box or casing open at one end and provided with a backwardly-directed spring-hook, said box or casing being also provided with two projecting parallel members which extend beyond the open end thereof and by means of which the said box or casing is secured to a portion of the envelop, and the other part of the device being yoke-shaped in form, and one side thereof being longer than the other and provided with a slot or opening, said yoke-shaped device being adapted to be connected with another portion of the envelop, substantially as shown and described.

2. A fastening device for envelops composed of two separate blanks, one of said blanks being oblong in form and adapted to be folded to form a yoke-shaped device, one side of which is longer than the other and provided with a slot or opening, and the separate sides of which are provided with holes which register and the other blank being composed of a body portion provided at one side with a projecting tongue and opposite said tongue with an extension or arm having a hole formed therein, said body portion being also provided at one side and at right angles to said tongue with an extension having an arm which projects in line with said tongue and which is provided with a hole and at the opposite side with another extension, said parts of said blank being adapted to be folded so as to form a box or casing open at one side and provided with a backwardly-directed spring-hook and with two parallel projecting arms or members which extend beyond the open end thereof and are provided with holes which register, substantially as shown and described.

In testimony that I claim the foregoing as my invention I have signed my name, in presence of the subscribing witnesses, this 7th day of May, 1901.

FELIX THOMAS FERNANDEZ.

Witnesses:
    M. T. Du Cros,
    Louis Barnett.